Patented Aug. 10, 1943

2,326,158

UNITED STATES PATENT OFFICE 2,326,158

EXTENDED TITANIUM DIOXIDE PIGMENT

Andrew T. McCord and Harold F. Saunders, Haddonfield, N. J., assignors to The Sherwin-Williams Company, Cleveland, Ohio, a company of Ohio No Drawing. Application October 23, 1942, Serial No. 463,081

7 Claims. (Cl. 106—300)

This invention relates to titanium extended pigments comprising titanium dioxide and calcium sulphate, and this application is a continuation in part of our copending application Serial No. 370,486, filed December 17, 1940.

The conversion of suitable calcium compounds to calcium sulphate of the anhydrite crystalline form by the action of strong sulphuric acid is well known. Calcium oxide, hydroxide, carbonate, or any other compound which will be converted into a sulphate by the sulphuric acid present, may be employed. The quantity of acid taken must be sufficient to react according to the equation $CaO+H_2SO_4=CaSO_4+H_2O$, and an excess is desirable. The strength of the acid must be sufficiently high to effect a dehydrating condition, otherwise the calcium sulphate will be in the gypsum rather than the anhydrite form, and the temperature of the reaction must be such that complete conversion to the anhydrite form results. The relations of concentration of acid, time, and temperature of treatment are well established.

In our copending application, Serial No. 370,486, of which the present application is a continuation in part, it was disclosed that if the anhydrite form of calcium sulphate be produced by the action of strong sulphuric acid on a calcium compound other than the sulphate, but capable of being converted to the sulphate by reaction with sulphuric acid, and that during the reaction and conversion of such calcium compound to anhydrite there is present a suitable titanium compound, the resulting anhydrite will be an improvement over that obtained in a similar reaction, but in the absence of the titanium compound, and will possess extreme whiteness of color, fine particle size, very soft texture, ease of mixing and dispersion in a vehicle, a definite improvement in chalk and fading resistance properties, and requiring shorter grinding time to reduce to the desired state of fineness, and be particularly well adapted for usage as an extender pigment in paints, or as a filler for paper, rubber, textiles, etc. That new product and the process of making it are claimed in that application.

One distinctive property of our new product is that when added to an ilmenite solution or other sulphuric acid solution of titanium, and the mixture thermally hydrolyzed, the precipitate obtained will by calcination at between 700 and 1000° C. be converted into a pigmentary titanium dioxide of rutile structure associated with calcium sulphate of anhydrite form. For this reason we have termed our product "activated anhydrite," and shall hereinafter refer by this term to calcium sulphate of the anhydrite crystalline structure as produced by the action of strong sulphuric acid upon a suitable calcium compound, such reaction having taken place in the presence of a suitable titanium compound, said titanium compound having been added prior to the reaction between the calcium compound and the sulphuric acid, and present during the formation of the calcium sulphate from the original calcium. By the term "activation" we mean the conferring upon calcium sulphate the characteristic property of effecting the precipitate of hydrous titanium oxide obtained by boiling an ilmenite solution in the presence of the activated calcium sulphate in such a manner that upon calcination it is converted into rutile rather than anatase.

No one particular form of titanium compound is necessary for the production of the activated anhydrite, and we may employ a hydrous titanium dioxide such as $\gamma$-titanic acid or the precipitate obtained from mineral acid solutions of titanium by thermal hydrolysis or by reaction with an alkaline material, or we may use a soluble titanium compound such as titanium sulphate, nitrate, chloride, or fluoride providing the compound employed will during the reaction between the calcium compound and the sulphuric acid associate itself with the calcium sulphate formed or be transformed to another compound of titanium associated with the calcium sulphate.

We may use the hydrous titanium dioxide termed by us "$\gamma$-titanic acid," such as may be obtained by contacting a solution of ammonium fluotitanate with aqua ammonia, washing, separating and drying according to the process of Todd and Verduin, Serial No. 321,974, or by other methods such as described by McCord in application Serial No. 349,345. $\gamma$-titanic acid is further distinguished in possessing a crystalline structure in which the chemical constituents are so arranged in the lattice as to produce upon X-ray analysis a characteristic band pattern, the bands of which are spaced on a scale measured in Angstrom units to correspond to interplanar distances of

| d/n (Å) | Intensity |
|---|---|
| 5.83 | 5 |
| 3.99 | 10 |
| 3.40 | 6 |
| 3.145 | 2.5 |
| 2.600 | 2.5 |
| 2.342 | 3.5 |
| 2.132 | 3.5 |
| 1.888 | 8.0 |
| 1.696 | 1.5 |
| 1.499 | 9.5 |
| 1.354 | 3.0 |
| 1.247 | 2.5 |
| 1.177 | 3.5 |
| 1.087 | 2.5 |
| 1.048 | 5.0 |
| 1.011 | 1.5 |
| 0.956 | 6.0 |
| 0.917 | 0.5 |
| 0.894 | 2.0 |
| 0.868 | 4.0 |
| 0.843 | 0.5 |
| 0.813 | 3.0 |
| 0.785 | 2.0 |
| 0.747 | 3.0 |
| 0.712 | 3.5 |
| 0.692 | 1 |
| 0.682 | 2.5 |
| 0.670 | 3.5 |
| 0.656 | 1 |

The strength of the sulphuric acid employed is not critical but must be sufficiently high that upon dilution by the addition of the aqueous slurry of the calcium compound, a dehydrating condition is retained. We prefer to use sulphuric acid of 90% concentration and a minimum of 80% concentration, but a concentration somewhat lower than this may be employed providing the temperature of reaction is maintained sufficiently high. By using a 90% concentration the heat of reaction alone is sufficient to cause the batch to boil and no additional heat is necessary. As the concentration drops below 80%, addition of heat is required to complete the conversion to the anhydrite form with no gypsum present. Nevertheless, formation of anhydrite may be effected with these weaker acids if a suspension is boiled for a sufficient period of time.

As an example of our procedure in making activated anhydrite we set forth the following:

EXAMPLE 1

To 421 grams of 90% sulphuric acid was added a quantity of γ-titanic acid equivalent to 4.2 grams of $TiO_2$, and to this dispersion was then slowly added with agitation a slurry of 100 grams of calcium oxide in 900 grams of water. The heat of reaction causes the mixture to boil. The resulting slurry was a sulphuric acid suspension of activated anhydrite, having a small amount of titanium compound associated with it and effecting activation.

Other procedures for the production of activated anhydrite and employing forms of titanium compound other than γ-titanic acid and compounds of calcium other than the oxide, were disclosed in our copending application Serial No. 370,486.

In carrying out our invention, the activated calcium sulphate may be obtained in various different forms. It may be a suspension in sulphuric acid which may be used for addition to and nucleation of an ilmenite solution for the production therefrom by boiling of an extended $TiO_2$ pigment ($CaSO_4/TiO_2$) or straight $TiO_2$, or it may be a dry activated calcium sulphate, or it may be a dry and calcined activated calcium sulphate. The last two have by themselves value as pigmentary materials for use in paints or as fillers in paper, textiles, rubber and the like.

The usual practice for the preparation of the so-called "titanium extended pigments" consists in using a solution of titanium sulphate in sulphuric acid, which has been obtained by the digestion of ilmenite or other titaniferous ores with sulphuric acid, and precipitating the titanium as a hydrous titanium oxide from such solution in the presence of the extender, by boiling. The mixture of the extender and such hydrous titanium oxide, after washing, is then calcined to drive off the sulphuric radical and convert the titanium hydrate into pigmentary titanium dioxide. In prior practice, the titanium content of such extended pigment has been in the form of anatase.

In application Serial No. 349,345, a method was disclosed wherein a slurry of an extender and a titanium hydrate in dilute sulphuric acid was boiled, dewatered and calcined. The specific form of hydrous titanium dioxide used therein was added as the γ-titanic acid, and in the resulting extended pigment, the titanium is in the rutile modification.

The invention herein claimed is based on our discovery that if the extender which is added to an ilmenite solution before the latter is hydrolyzed in the presence of the extender, be of the specific type claimed in our application 370,486, and referred to as "activated anhydrite" or "activated calcium sulphate," the precipitate which is obtained by hydrolysis of the ilmenite solution in the presence of such specific extender will, after separating, washing and calcining, have its titanium content of the rutile modification. The product is of unusual whiteness, brightness and fine texture, and possesses a hiding power markedly higher than the similar products of the prior art. Such extended pigment has been made according to the following examples, using activated anhydrite prepared in any of the ways hereinbefore described, and with equivalent results. In the following examples, the activated anhydrite may be made by any of the procedures hereinbefore described or referred to, and therefore the following examples are not to be confined to any one of the specific methods of forming the activated anhydrite.

By "ilmenite solution" or "ilmenite-sulphuric acid solution" we include any of the usual solutions as prepared by methods of the prior art by the general process of digestion of ilmenite ore or other titanium-bearing material with strong sulphuric acid, recovering the titanium content by leaching the digestion mass, and purification or partial purification of this solution of titanium by any of the well known methods.

It is obvious that when activated anhydrite is prepared for the purpose of adding it to an ilmenite solution to produce a rutile-calcium sulphate pigment, the amount of the titanium compound used in the preparation of the activated anhydrite need not necessarily be limited to the small percentages described in our application Serial No. 370,486. Since γ-titanic acid in itself is convertible to rutile upon calcination at 750 to 1000° C., any excess percent over the amount required to effect activation of the anhydrite will simply be carried over into the ilmenite as additional $TiO_2$ in the mixture, such $TiO_2$ being capable of being converted to rutile simultaneously with the $TiO_2$ content of the mixture as introduced in the ilmenite solution, and we hold the use of greater quantities of $TiO_2$ than shown in the examples for the preparation of activated anhydrite as being within the scope of this invention.

EXAMPLE 2.—$TiO_2$-extended pigment (70% $CaSO_4/30\%$ $TiO_2$)

A quantity of the sulphuric acid suspension of activated anhydrite obtained by the method of Example 1, and adjusted to contain 245 grams of $CaSO_4$, 210 grams of $H_2SO_4$, and 966 grams of water, was added to 1150 grams of ilmenite solution containing 8.1% $TiO_2$, 20.2% $H_2SO_4$, and 13.85% $FeSO_4$. The $H_2SO_4$ is both that which is free and that which is combined with titanium, but does not include that combined with the iron. The mixture was then boiled for 3 hours, by which time about 95% of the titanium was precipitated. The solids were separated and washed until the filtrate was substantially free from iron. The washing removes a small amount of $CaSO_4$, leaving a product which then contained approximately 70 parts of $CaSO_4$ and 30 parts $TiO_2$. The cake was dewatered to about 45% solids and the moist cake calcined 2 hours at 975° C. The titanium in the product was all in the crystalline form of rutile.

The calcination above referred to was performed in the laboratory. In a rotary calciner, a lower temperature of about 875 to 900° C. would be employed, according to the factor of calciner operation difference. The range of calcination may be stated as 750° to 1000° C.

It has been found advantageous to treat the moist cake prior to calcination with a compound of a metal of the second group of the periodic table as described in application Serial No. 367,390, since this treatment reduces the temperature and time required in calcination to effect proper development of crystallinity, hiding power, and other desirable pigmentary properties. An example of a procedure including such treatment is as follows:

EXAMPLE 3.—$TiO_2$ extended pigment (70% $CaSO_4/30\%$ $TiO_2$)

Into the moist cake in Example 2 and prior to calcination, was incorporated 0.2% of MgO based on the total solids in the form of $MgSO_4$ previously dissolved in a little water. This cake was then calcined for 4 hours at 900° C.

EXAMPLE 4—$TiO_2$ extended pigment (30% $CaSO_4/70\%$ $TiO_2$)

A quantity of the sulphuric acid suspension of activated anhydrite obtained in Example 1, sufficient to contain 245 $CaSO_4$ was added to 6615 grams of ilmenite solution containing 8.1% $TiO_2$, 20.2% $H_2SO_4$ and 13.85% $FeSO_4$. The mixture was boiled 4 hours, dewatered and washed until substantially iron-free. The moist cake containing approximately 35% solids and a ratio of $CaSO_4/TiO_2$ of 30/70 was mixed with 0.2% ZnO based on total solids (as a solution of $ZnSO_4$) and calcined 2 hours at 950° C. The titanium content of the product is in the rutile crystalline modification.

EXAMPLE 5

The precipitate from Example 4 was washed for a sufficient time to remove substantially all of the $CaSO_4$, dewatered, and the moist cake mixed with 0.2% ZnO (based on $TiO_2$), as a solution of zinc sulphate. Calcination for 2 hours at 950° C. produced a pigmentary rutile practically 100% $TiO_2$.

EXAMPLE 6.—Use of large proportion of $TiO_2$ in making the activated anhydrite To 421 grams of 90% sulphuric acid was added a quantity of γ-titanic acid equivalent to 40 grams $TiO_2$, and after the solids had dispersed 100 grams of calcium oxide in 900 grams of water was slowly added as a slurry with good agitation. The heat reaction caused the mixture to boil. The lime slurry was added in 30 minutes. The resulting slurry consisted of a suspension of activated anhydrite and titania hydrate in sulphuric acid. Microscopic examination disclosed the complete absence of gypsum. To the slurry was added 626 grams of an ilmenite solution containing 8.5% $TiO_2$, 21.4% $H_2SO_4$ and 14.1% $FeSO_4$. The mixture was boiled for 3 hours, by which time the sample of filtrate contained 3.9 g./l. $TiO_2$.

The solids were separated and washed until substantially free from iron, using approximately 5 times the original volume of wash water.

The dewatered cake was calcined for 2 hours at 975° C. to produce a product containing approximately 30% rutile and 70% anhydrite.

The examples put forth are typical and may be considered sufficient to disclose the process. It is to be understood that any of the activated anhydrites may be used in place of the particular one of Example 1. It is also to be understood that the examples above representing 70/30 ratio $CaSO_4/TiO_2$ are only representative, as ratios of $TiO_2$ from 1 up to 100 are within the scope of the practice of this invention.

The following tabulation demonstrates the superiorities of our pigment.

Tinting strength determined by the A. S. T. M. procedure D-332-36

| | |
|---|---|
| 70/30 $CaSO_4$/anatase pigment by prior art (high grade commercially available pigments) | 450–470 |
| 70/30 pigment from anhydrite activated with γ-titanic acid as per Examples 2 and 3 | 610 |
| 70/30 pigments from various activated anhydrites | 550–640 |

Hiding power

Hiding power as square feet per pound of pigment was determined according to A. S. T. M. Designation D-406-39, on the prior art pigments, and shows 48 square feet, while our products showed from 55 to 65 square feet.

Color

A direct visual comparison in oil shows ours product to be equal or superior to the highest grade 70/30 $CaSO_4$ anatase extended pigments available, and to possess a superior retention of color on exposure to atmospheric condition in paint film.

Because of the greater hiding power, further extension of rutile pigments in paint formulation is possible with our pigments, to obtain hiding power equal to prior art pigments. Besides economy, another advantage of this lies in ability to obtain considerably further flatting effects in flat paint formulation, since flatting is in considerable measure increased with increasing proportion of inert pigments.

It would not appear necessary to present detail paint formulations illustrating usage of our pigment, since formulation with $CaSO/TiO_2$ extended pigments is common knowledge. Our products may be substituted pound for pound for prior art pigment with the improved results in hiding, color brightness, etc., previously noted, or reduced cost with equivalent hiding may be secured by the use of less pigment, the difference in weight being compensated by addition of a low priced extender pigment.

Having thus described our invention, what we claim as new and desire to secure by Letter Patent is:

1. The process of forming an extended pigment composed essentially of titanium oxide in the rutile form and calcium sulphate in the anhydrite form, which includes boiling an ilmenite sulphuric acid solution containing a suspension of activated anhydrite, separating the solids from the liquid and calcining them at a temperature of 750° to 1,000° C.

2. The process of forming an extended pigment composed essentially of titanium oxide in the rutile form and calcium sulphate in the anhydrite form, which includes boiling an ilmenite sulphuric acid solution containing a suspension of activated anhydrite, separating the solids from the liquid, washing the solids free of iron, and calcining.

3. The process of forming an extended pigment composed essentially of titanium in the rutile form and calcium sulphate in the anhydrite form, which includes boiling an ilmenite sulphuric acid solution containing a suspension of activated anhydrite, separating the solids from the liquid, adding a small amount of a compound of a metal of group IIb of the periodic table, and calcining.

4. As a new rutile pigmentary composition, a product identical with that obtained by the process defined in claim 1.

5. As a new rutile pigmentary composition, a product identical with that obtained by the process defined in claim 2.

6. As a new rutile pigmentary composition, a product identical with that obtained by the process defined in claim 3.

7. The process of forming a pigment containing titanium dioxide in the rutile form, which includes boiling an ilmenite sulphuric acid solution containing a suspension of activated anhydrite, separating the solids from the liquid, washing the solids free of iron and calcium, and calcining.

ANDREW T. McCORD.
HAROLD F. SAUNDERS.